Patented June 6, 1939

2,161,745

UNITED STATES PATENT OFFICE 2,161,745

TETRAHYDROFURFURYLAMINONAPHTHALENE COMPOUNDS AND PROCESS FOR THEIR PREPARATION

James G. McNally and Joseph B. Dickey, Rochester N. Y., assignors to Eastman Kodak Company, Rochester, N. Y., a corporation of New Jersey No Drawing. Application April 28, 1937, Serial No. 139,610

3 Claims. (Cl. 260—345)

This invention relates to 1-tetrahydrofurfurylamino-5-hydroxynaphthalene and 1,5-ditetrahydrofurfurylaminonaphthalene and a process for preparing these compounds.

We have discovered that a mixture of 1-tetrahydrofurfurylamino-5-hydroxynaphthalene,

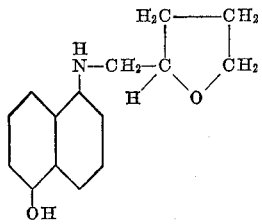

and 1,5-ditetrahydrofurfuryaminonaphthalene,

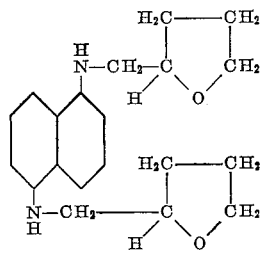

can be prepared by heating an aqueous mixture of 1,5-naphthol, an alkali metal bisulfite, sodium bisulfite and potassium bisulfite, for example, and tetrahydrofurfurylamine to an elevated temperature. By an "elevated temperature" is meant a temperature sufficiently high to effect the desired reaction. Advantageously, the reaction mixture is heated to a refluxing temperature. The 1-tetrahydrofurfurylamino - 5 - hydroxynaphthalene and 1,5 - ditetrahydrofurfurylaminonaphthalene formed in the reaction which takes place can be separately recovered as hereinafter described.

The compounds of our invention in purified form are substantially colorless crystalline substances. They constitute valuable dye intermediates for the preparation of azo dyes.

The following example illustrates the method of preparation of the compounds of our invention.

Example 1

48 grams of 1,5-naphthol, 17 grams of sodium bisulfite, 55 grams of tetrahydrofurfurylamine and 300 cc. of water are heated together under reflux with stirring for 16 hours. The reaction mixture resulting is cooled, made acid to Congo red paper by the addition of hydrochloric acid and extracted with ether to remove any unreacted 1,5-naphthol. The aqueous residue remaining is filtered to remove impurities and the filtrate is made alkaline by the addition of sodium hydroxide. 1,5 - ditetrahydrofurfurylaminonaphthalene is precipitated upon the addition of the sodium hydroxide and is recovered by filtration as a brown crystalline solid. It may be purified by crystallization from ethyl alcohol, for example, and when purified is a substantially colorless crystalline substance.

The aqueous residue remaining after separation of the 1,5-ditetrahydrofurfurylaminonaphthalene is made acid to Congo red paper by the addition of hydrochloric acid and concentrated under reduced pressure. On standing, 1-tetrahydrofurfurylamino-5-hydroxynaphthalene hydrochloride separates as a brownish crystalline solid and may be recovered by filtration. This material can be dissolved in hot water, treated with an activated charcoal, filtered, and cooled to give white crystals of 1-tetrahydrofurfurylamino-5-naphthol hydrochloride. The free base can be obtained by treating the hydrochloride in water with an alkali metal salt such as sodium bicarbonate or sodium acetate.

The foregoing example illustrates but one satisfactory way in which the compounds of our invention may be prepared. It is not intended to limit the process of the invention as various modifications are possible. To illustrate, the aqueous residue remaining after separation of any unreacted 1,5-naphthol may be filtered and made alkaline with an alkali metal hydroxide, other than sodium hydroxide, such as potassium hydroxide. Similarly the aqueous residue remaining after separation of the 1,5-ditetrahydrofurfurylaminonaphthalene may be made acid by the addition of a mineral acid other than hydrochloric acid. Sulfuric acid and phosphoric acid, for example, can be employed in which event the 1-tetrahydrofurfurylamino-5-hydroxynaphthalene would be recovered in the form of its sulfuric or phosphoric acid salt, respectively. 1-tetrahydrofurfurylamino - 5 - hydroxynaphthalene can be recovered from its salts in known fashion. This conversion can be effected, for example, by treatment of the salt in water with a suitable base. Advantageously an alkali metal salt may be employed. The use of a strong base such as NaOH is not recommended because of the ready solubility of 1 - tetrahydrofurfurylamino - 5 - hydroxynaphthalene in alkaline solution. A strong base such as NaOH could be employed however if added carefully so as to avoid excess alkalinity.

If desired, 1,5-ditetrahydrofurfurylaminonaphthalene can be converted to its salt form by neutralizing with a mineral acid such as hydrochloric, sulfuric or phosphoric acid whereby the salt of the respective acid employed is formed. It will be understood that our invention includes 1-tetrahydrofurfurylamino-5-hydroxynaphthalene and 1,5 - ditetrahydrofurfurylaminonaphthalene, as such, as well as the salts of these compounds.

We claim:

1. The process of preparing a mixture of 1-tetrahydrofurfurylamino-5-hydroxynaphthalene and 1,5 - ditetrahydrofurfurylaminonaphthalene which comprises reacting an aqueous mixture of 1,5-naphthol, an alkali metal bisulfite and tetrahydrofurfurylamine at an elevated temperature.

2. The process of preparing 1,5-ditetrahydrofurfurylaminonaphthalene which comprises heating an aqueous mixture of 1,5-naphthol, sodium bisulfite and tetrahydrofurfurylamine under reflux, cooling the reaction mixture, acidifying the cooled reaction mixture with a mineral acid, extracting the reaction mixture with ether to remove 1,5-naphthol present and adding an alkali metal hydroxide in sufficient amount to cause precipitation of 1,5 - ditetrahydrofurfurylaminonaphthalene.

3. The process of preparing 1-tetrahydrofurfurylamino-5-hydroxynaphthalene which comprises heating an aqueous mixture of 1,5-naphthol, an alkali metal bisulfite and tetrahydrofurfurylamine under reflux, cooling the reaction mixture, acidifying the cooled reaction mixture, removing unreacted 1,5-naphthol present, adding an alkali in sufficient amount to cause precipitation of 1,5-ditetrahydrofurfurylaminonaphthalene, removing the precipitated 1,5-ditetrahydrofurfurylaminonaphthalene, acidifying the aqueous residue remaining upon separation of the 1,5 - ditetrahydrofurfurylaminonaphthalene with a mineral acid, concentrating said aqueous residue to precipitate 1-tetrahydrofurfurylamino-5-hydroxynaphthalene in salt form and converting said salt of 1 - tetrahydrofurfurylamino - 5 - hydroxynaphthalene to 1-tetrahydrofurfurylamino-5-hydroxynaphthalene.

JAMES G. McNALLY.
JOSEPH B. DICKEY.